United States Patent [19]

Hoxmeier

[11] Patent Number: 5,548,030

[45] Date of Patent: Aug. 20, 1996

[54] BLOCK COPOLYMER OF POLYALKYLENE AND HALOGENATED POLY(VINYL AROMATIC)

[75] Inventor: Ronald J. Hoxmeier, Houston, Tex.

[73] Assignee: Shell Oil Company, Houston, Tex.

[21] Appl. No.: 394,528

[22] Filed: Feb. 17, 1995

Related U.S. Application Data

[62] Division of Ser. No. 349,705, Dec. 5, 1994, which is a continuation of Ser. No. 574,170, Aug. 27, 1990, abandoned.

[51] Int. Cl.$^6$ ................................ C08F 8/04; C08F 8/22
[52] U.S. Cl. ..................... 525/314; 525/332.3; 525/940
[58] Field of Search .................... 525/314, 332.2

[56] References Cited

U.S. PATENT DOCUMENTS

| | | |
|---|---|---|
| 3,576,912 | 4/1971 | Winkler . |
| 3,629,371 | 12/1971 | Winkler . |
| 3,686,366 | 8/1972 | Winkler . |
| 3,824,149 | 7/1974 | Harlan et al. . |
| 3,904,801 | 9/1975 | Harlan, Jr. . |
| 3,917,742 | 11/1975 | Harlan, Jr. . |
| 3,959,398 | 5/1976 | Jalios . |
| 4,279,808 | 7/1981 | Hornbaker et al. . |
| 4,352,909 | 10/1982 | Barda et al. . |
| 4,650,832 | 3/1987 | Kuwalski et al. . |
| 4,740,556 | 4/1988 | Abolins . |
| 4,851,476 | 7/1989 | Willis . |
| 4,879,353 | 11/1989 | Sanders et al. . |
| 4,940,807 | 7/1990 | DePriest . |
| 4,966,946 | 10/1990 | Favstritsky et al. . |
| 4,975,496 | 12/1990 | Tigner et al. . |
| 5,246,987 | 9/1993 | Masse et al. ........................ 524/68 |
| B14,200,703 | 7/1987 | Diebel et al. . |

OTHER PUBLICATIONS

Billmeyer, F. W., "Textbook of Polym. Sc.", N.Y., Interscience, 1965, pp. 292, 297 and 298.

*Primary Examiner*—Vasu S. Jagannathan

[57] ABSTRACT

A block copolymer is provided, the block copolymer halogenated polystyrene comprises the formula:

$$S'-A-(A-S')_m$$

in which m is 0, 1, 2, 3 or 4, A is a saturated polyalkylene, and S' is a nuclear brominated poly(vinyl aromatic) having from about 0.5 to about 5 bromines per styrene unit. The vinyl aromatic blocks are substantially free of halogen other than bromine and the polyalkylene is substantially free of halogen. The compositions retain the elastomeric properties of the non-halogenated form of the compounds while having significantly reduced flammability along with improved tensile strength and high temperature properties.

10 Claims, No Drawings

BLOCK COPOLYMER OF POLYALKYLENE AND HALOGENATED POLY(VINYL AROMATIC)

This is a division of application Ser. No. 08/349,705, filed Dec. 5, 1994 pending, which is a continuation of application Ser. No. 07/574,170 filed Aug. 27, 1990, now abandoned.

FIELD OF THE INVENTION

The present invention relates to novel block copolymers of polyalkylenes and halogenated poly(vinyl aromatics), and more particularly to compositions retaining advantageous physical properties but having reduced flammability. This invention also relates to a novel process to prepare these block copolymers.

BACKGROUND OF THE INVENTION

Saturated polyalkylenes, such as polyethylene, polypropylene, etc., display elastomeric properties which make them useful in varied applications. In particular, block copolymers of vinyl aromatics and polyalkylenes are useful due to their excellent elastomeric properties without the need to be vulcanized. However, polyalkylenes have a higher flammability than is desired for certain applications. It is therefore advantageous to prepare a polymer which retains the elastomeric properties associated with the polyalkylenes, but which has reduced flammability.

As reported in U.S. Pat. Nos. 3,576,912 and 3,686,366, both issued to Winkler, halogenation of unsaturated polymers has been carried out in the prior art for preparation of fire resistant polymers. It has been found, however, that halogenation to an extent effective in providing the desired degree of fire resistance results in a loss of a portion of the elastomeric properties of the unhalogenated polymer.

The Winkler patents further disclose the preparation of block copolymers of monovinyl arenes and conjugated dienes in which the diene blocks are selectively halogenated. The Winkler patents describe the substantially exclusive halogenation of the conjugated diene polymer block (such as polybutadiene or polyisoprene), with the thermoplastic monovinyl arene blocks being substantially unaffected. The Winkler patents disclose as halogenation agents N-halomides, bromoanilides, bromoamines, hydrogen bromide and N-monohalohydantoins, or the corresponding chlorinated compounds, and reacts these compounds with ethylenic unsaturation. The Winkler processes intentionally provide for essentially no reaction in the monovinyl arene polymer blocks for the express purpose of maintaining the original physical properties of the block copolymer. Although the brominated rubber produced by Winkler's methods are useful rubbers, comparing Winkler's Example IV to the base polymer of Winkler's Example I from '366 reveals that the mid-block bromination decreases tensile strength by 14% and elongation at break by 40%. The brominated polymer was "harder" than the base polymer as indicated by a modulus which was 230% of that of the base polymer. It would be desirable to have brominated polymer which retained physical properties more like those of the base polymer.

U.S. Pat. No. 4,352,909 issued to Barda et al. discloses brominated polystyrene, a process to brominate oligomers and polymers of styrene, and the use of brominated polystyrenes as flame retardant additive for engineering thermoplastic and thermoset resin compositions. The preferred process to brominate the styrene polymers is to react the polymer with a stoichiometric excess of bromine chloride in a chlorinated hydrocarbon solvent and in the presence of a Lewis acid of a metal chloride salt. This patent discloses a process to graft nuclear bromine to styrene polymers, but does not teach or suggest that the process would selectively graft halogens to aromatic rings in polymers which contain both styrene and alkylenes.

Further, the process disclosed in '909 requires that anionically polymerized polystyrene be recovered from the polymerization system, redissolved in a halogenated solvent and contacted with the Lewis acid of the metal chloride salt catalyst. A process which does not require recovery of the polymer from the polymerization solvent would be desirable. Elimination of this process step would save considerable expense in manufacturing polymers which are halogenated by this process.

It is therefore an object of the present invention to provide a halogenated vinyl aromatic-conjugated diolefin block copolymer composition having blocks of polyvinyl aromatic containing nuclear aromatic halogen, and blocks of saturated polyalkylene.

Another object of the present invention is to provide a halogenated vinyl aromatic-conjugated diolefin block copolymer composition containing substantially all of the halogen in the vinyl aromatic blocks.

An additional object of the present invention is to provide a halogenated vinyl aromatic-conjugated diolefin block copolymer which substantially retains its elastomeric properties, but which has lower flammability than the vinyl aromatic block copolymer before halogenation.

In another aspect, it is an object of this invention to provide a process to prepare a polymer comprising vinyl aromatic and hydrogenated conjugated diolefin monomer units wherein the aromatic rings are selectively halogenated by hydrogenation of a conjugated diolefin-vinyl aromatic copolymer, and then halogenation prior to separation of the polymer from the hydrogenation catalyst and medium.

SUMMARY OF THE INVENTION

The objects of this invention are achieved by providing a block copolymer of saturated polyalkylene and nuclear halogenated polystyrene. The copolymer has from one to five vinyl aromatic blocks, with from about 0.5 to about 5 bromines per aromatic ring. The polyalkylene blocks are substantially free of halogen. The term polyalkylene includes hydrogenated polymerized conjugated diolefins.

In another aspect, the present invention provides a process to selectively halogenate aromatic rings of a hydrogenated aromatic containing polymer wherein a polymer comprising conjugated diolefin and vinyl aromatic monomer units is hydrogenated in an inert hydrocarbon solvent utilizing a hydrogenation catalyst prepared by combining a Group VIII metal carboxylate or alkoxide with an alkyl or hydride of a Group I, II or III metal, and the hydrogenated polymer and hydrogenation catalyst are contacted with a halogen under conditions effective to halogenate the block copolymer. This process selectively halogenates the aromatic rings of the polymer without requiring recovery of the hydrogenated polymer from the hydrogenation solvent and utilization of a separate halogenation catalyst.

DETAILED DESCRIPTION OF THE INVENTION

The present invention provides a halogenated polyalkylene-poly (vinyl aromatic) block copolymer which substantially retains the elastomeric properties of the base block copolymer while having lowered flammability, and to a novel process to prepare such polymers. The copolymer comprises blocks of poly (vinyl aromatic) containing nuclear aromatic halogen, together with blocks of saturated polyalkylene. Substantially all of the halogen is in the poly (vinyl aromatic) blocks. The preferred halogen is bromine, with chlorine also being present in certain embodiments of the inventive composition.

The block copolymer of the present invention comprises polyalkylene and halogenated poly(vinyl/aromatic) represented by the formula:

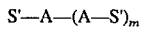

S'—A—(A—S')$_m$ in which m is 0, 1, 2, 3, or 4, A is a saturated polyalkylene, and S' is a nuclear brominated vinyl aromatic. The copolymer therefore has from one to five vinyl aromatic blocks.

The contemplated structure of the composition will vary in accordance with the value of m. When m=0, the composition is a diblock comprising a single vinyl aromatic block and a single polyalkylene block. When m=1, the two polyalkylene blocks may be considered as a single block, and the composition comprises a triblock with polystyrene blocks on each side of the polyalkylene block. With m=2 to 4, the composition may be multiblock, branched, or "star shaped". The blocks could also be linear, with two or more of each type of block.

The polyalkylene blocks may comprise any of a wide variety of saturated polyalkylenes. Representative examples include polyethylene, polypropylene, poly(ethylene-propylene), polybutylene, poly(ethylenebutylene) and combinations thereof. A particularly preferred composition has poly-(ethylene-butylene) as the polyalkylene. The polyalkylene blocks are preferably hydrogenated conjugated diolefin blocks. These are preferred because of the ability to anionically polymerize conjugated diolefins and therefore the ability to prepare well defined block copolymers of conjugated diolefins and vinyl aromatics. Hydrogenated conjugated diolefin blocks are commonly referred to as polyalkylenes because they structurally resemble polymerized alpha olefins, although alpha olefins are not anionically polymerizable and cannot be polymerized into well defined block copolymers. Isoprene typically polymerizes to form a polymer which, after hydrogenation, resembles alternating ethylene-propylene units. Butadiene can be polymerized by 1–4 addition to resemble ethylene units, by 1–2 addition to resemble butylene units, or by a combination of 1–4 and 1–2 addition to resemble an ethylene-butylene polymer.

It is preferred that the polyalkylene be substantially free of halogen in order to retain elastomeric properties of the base polymer.

The vinyl aromatic blocks include nuclear halogen(s) and may be represented by the formula:

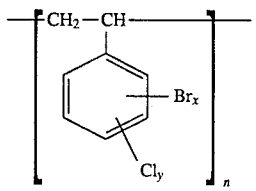

wherein n is an integer, x=0.5 to 5.0 times n, and y=0 to 1.5 times n. As used herein, "nuclear halogen", i.e., bromine or chlorine, refers to one which is present on the phenyl ring. As will be understood, the above formula represents that the vinyl aromatic blocks are comprised of "n" number of repeating aromatic units containing an average of "x" nuclear bromines per unit and an average of "y" nuclear chlorines per unit.

The vinyl aromatic is most preferably styrene, but may alternatively be substituted with a non-reactive group. Examples of acceptable vinyl aromatics include, along with styrene, alpha-methyl styrene and ring alkylated styrenes, and other monoalkenyl polycyclic aromatic compounds such as vinyl naphthalene and the like. The preferred vinyl aromatics include styrene and alpha-methyl styrene.

The polymeric blocks comprise predominantly monomers of the class which characterize the block, but may include other monomers. The additional monomers may be incorporated in either random or a tapered manner. The blocks are preferably essentially homopolymer blocks, or copolymer blocks of monomers from the class of monomers which characterize the block.

The preferred vinyl aromatic-hydrogenated conjugated diolefin block copolymers may be made by sequential anionic polymerization of the different monomers utilizing an anionic polymerization initiator such as an alkyl lithium. After two or more blocks are formed, the blocks may be terminated or coupled. Suitable coupling agents include carbon tetrachloride, carbon dioxide, silicon tetrachloride, dichlorobenzene or divinyl benzene. Polymerization is performed in an inert solvent such as cyclohexane or an alkyl and could also include an ether, such as tetra hydrofuran. Termination is typically accomplished by adding a small amount of an alcohol or water.

The vinyl aromatic-hydrogenated diolefin polymer may then be hydrogenated. Hydrogenation is preferably performed utilizing a catalyst prepared by reacting a Group VIII metal carboxylate or alkoxide with an alkyl or hydride of a Group I, II or III metal. Hydrogen partial pressures of between about 100 psi and about 1000 psi are acceptable and generally from about $6 \times 10^{-4}$ to about 2 mmoles of Group VIII metal per gram of polymer are acceptable. More preferably, the amount of Group VIII metal present is from about 0.006 to about 0.17 mmoles per gram of polymer. The molar ratio of Group VIII metal to Group I, II or III metal is typically between about 0.3 and about 0.6. The hydrogenation is preferably performed in the polymerization solvent to avoid the expense of removing the polymerization solvent and dissolving the polymer in a hydrogenation solvent.

The polymer may be selectively halogenated on the aromatic rings in the hydrogenation solvent utilizing halogenated hydrogenation catalyst as a halogenation catalyst. It is taught in the prior art that a halogenated hydrocarbon solvent is required to perform the halogenation due to the insolubility of the Friedel-Crafts catalyst in other solvents. Preparation of the hydrogenation catalyst results in a suspension of very small insoluble catalyst particles. These particles are often referred to as being subcolloidial in size. Halogenation of these small particles results in a Friedel-Crafts catalyst which, although insoluble, has sufficient surface area to catalyze the halogenation of aromatic polymers. Applicant has found that in spite of insolubility of the Friedel-Crafts catalyst, the polymerization and hydrogenation solvents are acceptable when the catalysts are prepared in this manner.

When a halogenation agent, such as $Br_2$ is passed through a solution of hydrogenated polymer and hydrogenation catalyst, a white precipate of metal chlorides forms, indicating oxidation of the hydrogenation catalyst. Further contact with $Br_2$ will result in liberation of hydrogen bromide, indicating that bromide is being grafted to the polymer. This grafting has been found to take place on the aromatic rings of the polymer forming nuclear bromine.

The nuclear halogen of the vinyl aromatic blocks is preferably bromine. As indicated in the foregoing formula, the aromatic units may include as many as about 5 bromines per ring. However, reduced flammability may also be realized with considerably lower bromine substitution, namely as few as about 0.5 bromines per aromatic unit. The vinyl aromatic blocks preferably include from about 1 to about 2 bromines per aromatic unit.

The desired number of bromines per aromatic unit may be selected to achieve the desired reduction in flammability without an unacceptable affect on the elastomeric properties of a given composition. Typically, changes in the degree of bromination will have consequent affects on flammability and on physical properties. These properties may therefore be optimized for a particular copolymer and for a desired application by selecting the appropriate level of bromination. Thus, for a given composition (having a particular polyalkylene and value for "m"), the degree of nuclear bromination may be selected to provide the desired reduction in flammability in view of any effect on the elastomeric properties of the composition. In general, the degree of nuclear bromination is to that level which yields significant reduction in flammability and which provides substantial retention of the elastomeric properties of the non-halogenated form of the compound.

The vinyl aromatic blocks may include nuclear chlorines along with nuclear bromines. However, the vinyl aromatic blocks are preferably substantially free of nuclear halogen other than bromine and chlorine.

The present invention provides a block copolymer of polyalkylene and nuclear halogenated poly(vinylaromatic) which has reduced flammability but retains desired elastomeric properties. Thus, the present invention is particularly advantageous in relation to block copolymers of polyalkylenes and poly(vinylaromatics) which, in the non-halogenated form, have good elastomeric properties but undesirably high flammability. For these compositions, the modification of the poly(vinylaromatic) blocks to include nuclear halogens yields the contemplated advantage of producing a compound which substantially retains the elastomeric properties while having significantly reduced flammability. It is consequently an aspect of the present invention to modify such block copolymers to provide copolymers having nuclear halogenated poly(vinylaromatic) blocks.

The halogenated vinyl aromatic block copolymer of the present invention may be prepared by bromination of the vinyl aromatic blocks using known techniques. In general, the bromination may be accomplished with various brominating agents, in the presence of different catalysts, and in different solvents. The particular method used for brominating the vinyl aromatic blocks is not critical to the polymer of the present invention, except that the method preferably results in the polyalkylene being substantially free of halogen. The following preferred method for bromination of the vinyl aromatic blocks is therefore given for illustrative purposes only, and is not to be interpreted as limiting of the present invention.

A preferred method for preparing the inventive compositions of the present invention starts with a vinyl aromatic—saturated polyalkylene block copolymer. The starting material may be represented by the formula:

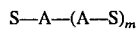

in which m is 0, 1, 2, 3 or 4, A is a saturated polyalkylene, and S is a polymerized vinyl aromatic (without nuclear halogen).

This compound may include a variety of polyalkylenes "A" as will yield the described compositions, for example: polyethylene, polypropylene, poly(ethylene-propylene), polybutylene, poly(ethylene-butylene) and combinations thereof. A preferred starting material is a triblock copolymer composed of polystyrene end blocks and a poly(ethylene-butylene) block. Such compounds are available from the Shell Chemical Company under the trademarks "KRATON® G-1650" and "KRATON® G-1652". These materials contain approximately 29% polystyrene and approximately 71% poly(ethylene-butylene).

When a commercially available hydrogenated block copolymer such as a KRATON rubber is utilized as a starting material, the non-halogenated block copolymer can be dissolved in an organic solvent, such as a chlorinated hydrocarbon solvent. The copolymer may then be subjected to halogenation with a halogenation agent, for example bromine chloride, in the presence of a catalyst, such as Lewis acid (antimony trichloride). The unreacted halogenation agent can then be removed and the catalyst inactivated. Finally, the halogenation reaction product can be isolated, as by adding the finished reaction mixture to a precipitating solvent and filtering the precipitated polymer from the solvent.

The preparation of the halogenated vinyl aromatic block copolymer may be more fully described as follows. The non-halogenated copolymer is contacted with an organic solvent such as methylene chloride until a clear solution is obtained. By way of example, dissolving usually involves use of 10–20 parts by weight of organic solvent per 1 part of "KRATON G-1652" rubber, and is usually completed in 1–2 hours at room temperature.

Halogenation can be carried out by adding the catalyst to the solution of the starting copolymer, and thereafter adding the halogenation agent dropwise. Addition of the halogenation agent is preferably carried out with cooling, at low temperature, at such a rate that accumulation of the brominating agent is minimized. After an eventual dilution with more of the organic solvent, the unreacted halogenation agent is removed and the catalyst inactivated. This is accomplished by adding to the finished reaction mixture an aqueous solution of a reducing agent, such as sodium sulfite, and agitating until the color of the halogenation agent disappears. Treatment with the reducing agent is followed by phase separation, and washing of the organic layer repeatedly with water until neutrality is achieved.

After concentrating, isolation of the halogenation reaction product is carried out by adding the neutralized reaction mixture to a large quantity of an energetically agitated aliphatic alcohol, such as methanol, and/or water. Addition of the reaction mixture can be carried out at room temperature, or at above room temperature. The latter approach has several advantages and is preferred. Thus, when the temperature of the alcohol or water is sufficiently high, i.e., sufficiently above the boiling point of the organic solvent used in the halogenation step, the solvent will be continually distilling out, causing droplets of the reaction mixture to "explode" in contact with the alcohol. This results in precipitation of brominated product in the form of fine, white particles. The organic solvent which distills out can be condensed and collected for recycling after being subjected to a purification step.

The final steps of the isolation of the halogenation product are filtration and drying. Filtration may be performed using a sintered glass funnel and an aspirator, and proceeds quickly. This is followed by washing with methanol, the purpose of which is to remove the last traces of the mother liquor. The washed product is dried in an oven with forced air circulation at temperatures ranging from ambient room temperature to approximately 100° C.

The resulting product will have a halogen content that will vary with the temperature used for the preparatory process. This halogen content may be expressed in terms of percentage of the resulting material, or as the average number of halogens per aromatic ring. For the example procedures using bromine and "KRATON G-1650", an approximate bromine content of 15% represents about 1 bromine per aromatic ring. Similarly, a 30% bromine content correlates to approximately 2 bromines per styrene unit. The polyalkylene remains substantially free of halogen.

The starting copolymer material is essentially elastomeric in nature, and these physical properties are substantially retained and/or improved in the resulting product. In addition, the substrate material is rendered less flammable by introduction of the halogen. The reduction in flammability is particularly significant when the halogen is bromine. Halogenation of the vinyl aromatic blocks also provides polar interactions between polymer molecules which increases the strength of the vinyl aromatic domains. This results in a polymer having a tensile strength over the non-halogenated polymer. The polar interactions also increase the glass transition temperature of the vinyl aromatic domains, and thus improve high temperature properties, especially properties near the glass transition temperatures of the unhalogenated vinyl aromatic domains such as 70° C. and 100° C. tensile strength, compression set and set after break. The polar interactions also drastically improve the polymer's resistance to non-polar solvents. These improvements come with very little loss of the base copolymer's elastomeric properties, such as elongation and modulus.

EXAMPLE 1

Bromination of Diblock Copolymer

A polystyrene block portion of a styrene-hydrogenated polyisoprene diblock copolymer was selectively brominated to a level of about 1.15 bromines per aromatic ring. The polymer was 33 percent by weight styrene and had a weight average molecular weight of about 100,000. The polymer was obtained as a 15.1 percent by weight of hydrogenated polymer solution in cyclohexane. The polymer solution was a hydrogenation reaction product containing the residue of the hydrogenation catalyst. The hydrogenation catalyst residue was the product of reacting a nickel octanoate with triethyl aluminum such that the solution contained about 400 ppm by weight of each nickel and aluminum.

About 1110 grams of the polymer solution was placed in a 3,000 ml flask, the flask being equipped with a stirrer and condenser. About 30 cc of bromine was added to the flask, and the solution was then stirred for 1½ hours. During this 1½ hour period, the polymer solution color changed from a dark red color to a more pale red color. The solution was then heated to 72° C., and 120 cc of bromine was added over a one hour time period. The solution was allowed to react for an additional four hours, and then cooled and coagulated into an isopropanol and methanol solution. The brominated polymer was filtered from the alcohol and oven dried at 55° C. for about three days. The dried rubber was redissolved in tetrahydrofuran, and held at 50° C. for four hours. The brominated polymer was then coagulated into solution of 1500 ml methanol and then filtered from the liquid and oven dried at 55° C. overnight. The recovered polymer had a tan color and was powdery in texture. The recovered polymer was 24% by weight bromine, which corresponds to an average of 1.15 bromines per aromatic ring.

$C^{13}$ analysis of the recovered polymer showed no evidence of aliphatic or benzylic bromine. The bromination occurred almost exclusively in the para position of the aromatic rings.

EXAMPLE 2

Bromination of Triblock Copolymer

The polystyrene portion of a styrene-hydrogenated butadiene-styrene triblock copolymer was selectively brominated to a level of an average of about 0.7 bromines per aromatic ring. The polymer was 26 percent by weight styrene in two end blocks of approximately equal molecular weight. The polymer was of a 54,000 weight average molecular weight. The polymer was obtained as a hydrogenation reactor product containing about 400 ppm each of nickel and aluminum hydrogenation catalyst residue. The hydrogenation catalyst was prepared in the same manner as described in Example 1. The solution contained about 30% by weight polymer in cyclohexane.

About 1910 grams of the solution was placed in a flask and heated to about 70° C. while being agitated. Bromine was added at a rate of about 3 ml per five minutes, until about 125 ml had been added. The solution was kept at 70° C. and agitated for an additional 2½ hours.

The solution was then cooled and added to alcohol in an attempt to precipitate the brominated polymer. Instead of solid particles of polymer coagulating, a thick, viscous paste of polymer formed. The alcohol solvent was removed from the paste by evaporation for 40 hours under a vacuum. The residue was then redissolved in tetrahydrofuran and then coagulated by adding water to the solution. Brominated polymer was coagulated and then rinsed with isopropanol and oven dried overnight.

The recovered polymer contained about 12.0 percent by weight of bromine, which corresponds to about an average of one bromine on 70 percent of the aromatic rings. As with the diblock, $C^{13}$ NMR indicated no evidence of aliphatic or benzylic bromine.

I claim:

1. A process to selectively halogenate aromatic rings of a polymer which comprises vinyl aromatic and hydrogenated conjugated diolefin monomer units, the process comprising the steps of:

a) hydrogenating a polymer which comprises vinyl aromatic and conjugated diolefin monomer units in the presence of a hydrogenation catalyst prepared by combining a Group VIII metal carboxylate or alkoxide with an alkyl or hydride of a Group I, II or III metal to selectively hydrogenate the conjugated diolefin monomer units; and b) halogenating the hydrogenated polymer by contacting the hydrogenated polymer and hydrogenation catalyst with a halogenation agent that selectively halogenates the vinyl aromatic.

2. The process of claim 1 wherein the polymer is a block copolymer comprising at least one vinyl aromatic block and at least one conjugated diolefin block.

3. The process of claim 1 wherein the vinyl aromatic is styrene.

4. The process of claim 3 wherein the conjugated diolefin is selected from the group consisting of isoprene, butadiene, and a mixture thereof.

5. The process of claim 1 further comprising the step of preparing the polymer by anionic polymerization of the monomers in an inert solvent before the polymer is hydrogenated wherein the hydrogenation is performed in the polymerization solvent.

6. The process of claim 1 wherein the halogenation agent is selected from the group consisting of $Br_2BrCl$ and $Cl_2$.

7. The process of claim 1 wherein the halogenated polymer comprises between about 0.5 and about 2 halogens, the the average, per aromatic ring.

8. The process of claim 7 wherein the halogenation agent is selected from the group consisting of $Br_2$ and $BrCl$.

9. The process of claim 8 wherein the vinyl aromatic is styrene.

10. The process of claim 9 wherein the conjugated diolefin is selected from the group consisting of butadiene, isoprene and combinations thereof.

* * * * *